Figure 1:
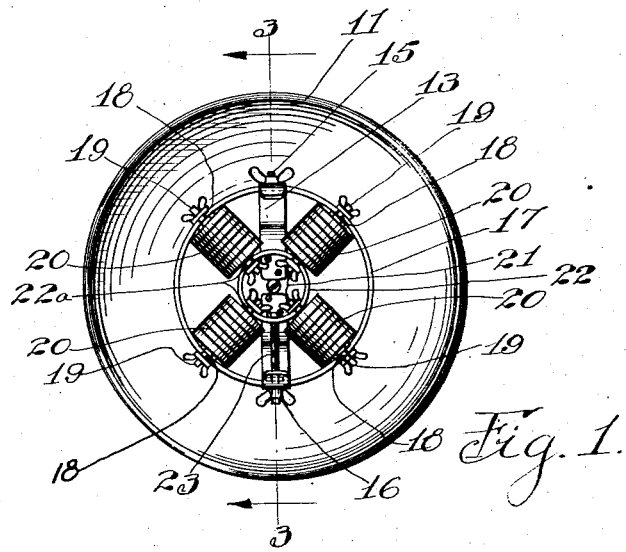

Oct. 16, 1928.

H. P. MacLAGAN 1,688,124

INFRA-RED RAY GENERATOR

Filed Jan. 3, 1927   2 Sheets-Sheet 1

INVENTOR.
HECTOR P. MACLAGAN.
BY Albert C. Bell
ATTORNEY.

Oct. 16, 1928.

H. P. MacLAGAN 1,688,124

INFRA-RED RAY GENERATOR

Filed Jan. 3, 1927  2 Sheets-Sheet 2

INVENTOR.
HECTOR P. MACLAGAN.
BY Albert C. Bell
ATTORNEY.

Patented Oct. 16, 1928.

1,688,124

UNITED STATES PATENT OFFICE.

HECTOR P. MacLAGAN, OF OAK PARK, ILLINOIS, ASSIGNOR TO McINTOSH ELECTRICAL CORPORATION, OF CHICAGO, ILLINOIS, A CORPORATION OF DELAWARE.

INFRA-RED-RAY GENERATOR.

Application filed January 3, 1927. Serial No. 158,574.

My invention relates to an improved construction of infra-red-ray generator for therapeutic purposes. In connection with the production of infra-red rays for therapeutic purposes, where the rays have been produced by electrically heated elements, difficulty has been experienced in the past in producing an element of considerable exposed area that would be uniformly heated over its entire surface, and mounting the element in such a manner that the rays emanating from the exposed surface would be projected with maximum efficiency and effect towards the subject being treated. This difficulty has been experienced particularly where electrically heated resistance wires have been employed, on account of the necessity of mounting the resistance wires on a suitable insulating medium, which has usually had the effect of producing a marked difference in the degree of heat between the wire and the insulating material, as a result of which to produce any considerable quantity of infra-red rays by the element as a whole, the resistance wire has necessarily been heated to a much higher degree than required to send off the desired infra-red rays from the resistance wire itself, to the end that the insulating material might be sufficiently heated to become effective in sending off such rays at least to an appreciable extent. As a result, light rays of much shorter wave length than the desired infra-red rays have been delivered from the element in considerable quantity and their presence in the rays given off by the generator containing the element, have not only reduced the efficiency of operation of the generator but in many cases, by the action of the light waves of shorter wave length, have produced undesirable results where only infra-red ray treatments were desired. A further difficulty experienced with electrically heated elements in the past, has been that where electrically heated resistance wire is used as the source of infra-red rays, it has been difficult, if not impossible, to select the heated material from the standpoint of the most effective production of infra-red rays, for the reason that metal or a metallic alloy has generally been found to be the only thing that would effectively respond to the flow of electric current to produce the desired heat and such metallic surfaces, particularly when heated, are not in the classification of ideal black bodies, which have been found to most effectively produce infra-red rays if they could be suitably heated.

By my invention, I construct an element for the production of infra-red rays in such a manner that although it is heated electrically by the flow of current through a resistance wire, and the wire employed may be selected from the standpoint of most efficient electrical action, I avoid the concentration of the heated areas, and I further avoid the effect of direct projection of the light rays from the wire itself, by mounting the resistance wire in a deeply grooved insulating support and filling the groove outside of the wire with insulating material selected primarily to present a radiating surface comprising as nearly as possible an ideal black body, and at the same time by having substantially the same or a somewhat lower conductivity to heat than the material of the insulating support, I secure a substantially uniform distribution of heat over the entire outer surface of the insulating support and the insulating material filling the grooves. The heating element of my invention distinguishes sharply from resistance units heretofore employed having embedded wires, in that in said resistance units the purpose is to protect the resistance wire against disintegration and at the same time to place the wire as near the surface of the unit as possible, so that the heat developed may be radiated as rapidly as possible with the wire protected from contact with the air; in constructing my heating element on the other hand, it is desired to produce a highly heated condition of the insulating support and radiation of the heat in the same manner that it is effected in an embedded resistance unit, would defeat the purpose of the present invention, and furthermore the resistance wire in my heating unit is heated purposely to a much higher degree than would be considered permissible with the resistance units referred to. To secure the ends described, I deeply embed the resistance wire in suitable grooves in the insulating support and then place in the grooves outside of the wire a substantial thickness of insulating material, to the end that the heat developed by the resistance wire cannot be freely and readily communicated through the insulating material covering it, directly to the atmosphere, but that on the other hand the only manner by which the heat can be radiated is to heat the entire insulating support and insulating material in the grooves to such a degree that the entire exposed surface is a dull red color, particularly adapted to give off infra-red rays. To facilitate permitting the resistance wire to be of sufficient cross section to effectively withstand the relatively high heating to which it must be subjected, and at the same time provide the requisite amount of resistance without making the element unduly bulky, I preferably wind the resistance wire in a nearly closed helix and make the grooves in the insulating supports in the form of threads or helices of a width to readily receive the helically wound wire, the depth of the grooves being preferably about twice the outside diameter of the wire helices and the amount of material of the insulating support remaining between the helical grooves being as small as it can consistently be made from mechanical considerations.

My invention further consists in mounting a plurality of elements of the kind referred to in a convenient holder, located in a reflector provided with an insulating handle and connecting devices by which the generator as a whole may be conveniently connected with a source of current supply. The holder for the elements is preferably constructed so that any one of the elements may be removed from the holder without disturbing the other elements, at the same time permitting the generator to be used with the remaining elements as though the one element had not been removed, which is of considerable advantage where for any reason it is necessary to repair or replace one of the heating elements.

Figure 2:
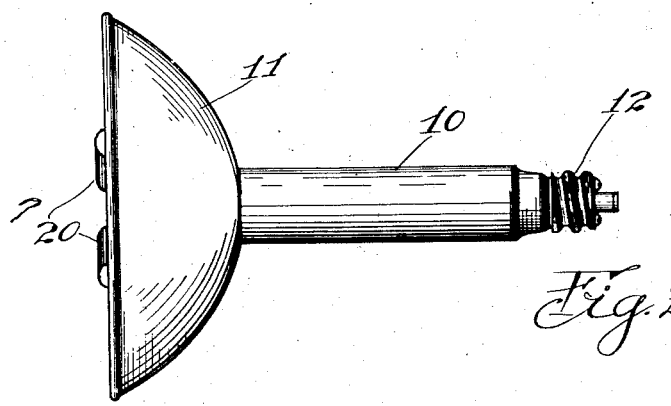
Figure 3:
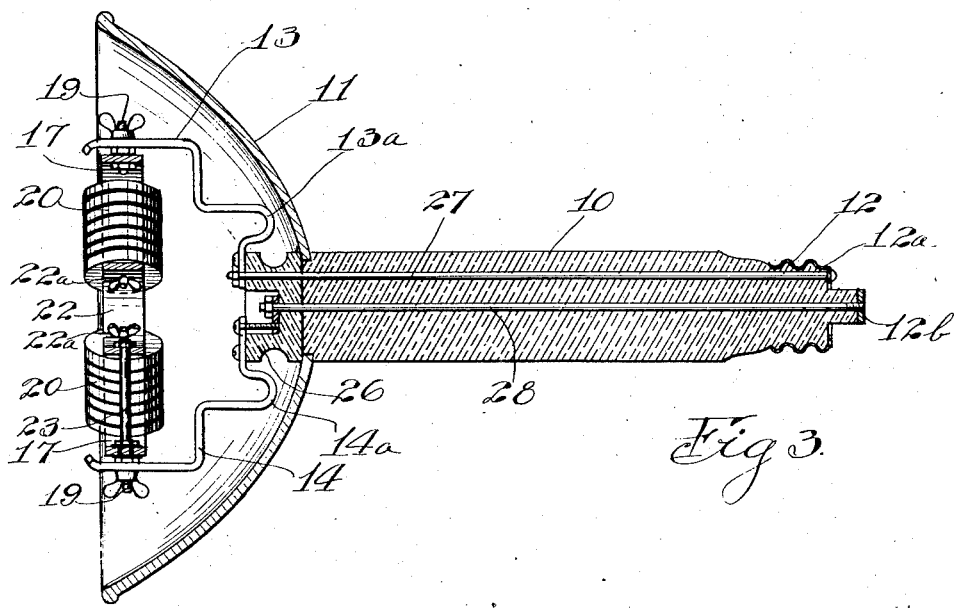
Figure 4:
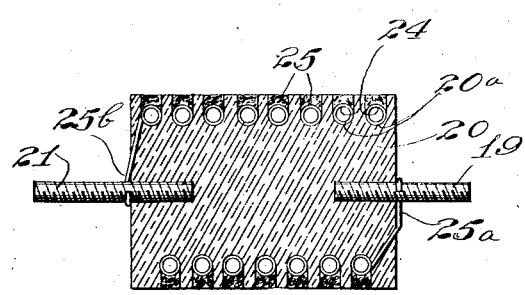

My invention will best be understood by reference to the accompanying drawings showing a preferred embodiment thereof in which Fig. 1 shows my generator in assembled condition in front elevation, Fig. 2 shows my assembled generator in side elevation, Fig. 3 is a longitudinal sectional view through the assembled generator to an enlarged scale, taken along the line 3—3 in Fig. 1, and Fig. 4 is a longitudinal central sectional view to a further enlarged scale through one of the heating elements.

Similar numerals refer to similar parts throughout the several views.

As shown in Figs. 1 and 2, my generator consists of a handle or support 10 of insulating material, for example lava or porcelain on one end of which a reflector 11 is mounted and on the other end of which a screw plug 12 is secured for connection with a suitable source of current. Within the reflector 11, as shown in Fig. 1, two supporting arms 13 and 14 are secured and the outer ends of these arms are provided with clamping screws 15 and 16 engaging opposite sides of a first mounting ring 17. The ring 17 which may be of any suitable conducting material is provided with a plurality of slots 18 which are preferably equidistant to receive the rods 19 extending outwardly from the heating elements 20. The elements 20 are provided with inwardly extending rods 21 engaging suitable slots 22ª in an inner supporting and conducting ring 22. The rods 19 and 21 are threaded at their outer ends to receive suitable thumb nuts by which the heating elements 20 may be clamped in the position indicated. The ring 22 is electrically connected with the arm 14 by a rod 23, which rod is insulated from the ring 17, the arm 14 being also insulated from the ring 17, while the arm 13 is electrically connected with said ring.

Each of the heating elements 20 is preferably constructed as shown in Fig. 4 and consists of a core of insulating material in which a helical groove 20ª is formed of a width to readily receive the resistance wire 24 wound in helical form. The groove 20ª is preferably about twice as deep as the helically wound wire 24 and the part of the groove outside of the wire 24, after it is placed in the groove, is filled with insulating material 25, preferably in paste form. The material of the insulating core is preferably porcelain or lava and the material of the insulating compound 25 is preferably similar, so that the core and insulating compound may be adapted to withstand a high degree of heat. The supporting rods 19 and 21 extend part way into the core of the heating element as indicated, but are sufficiently separated so that they are electrically insulated from each other. The ends of the resistance wire 25 are continued through the ends of the core and are electrically connected with the rods 19 and 21 as indicated at 25ª and 25ᵇ respectively, preferably by welding, to maintain good electrical connection therewith notwithstanding the repeated heating and cooling of the element. I find that lava provides a highly efficient surface for the radiation of infra-red rays when the material is sufficiently heated and I therefore prefer to use lava as the core material of the heating elements and I prefer to employ filling material 25 which consists preferably of lava in ground or powder condition, or the constituent parts of lava, to the end that when the filling material 25 is dry and baked in place by the heating of the resistance wire, it will have substantially the same radiating characteristics as the material of the core. With this construction it will be observed, a substantial amount of insulating material is present in the groove outside of the heating wire, and on account of this material having substantially the same heat conducting characteristics as the material of the core, and the wall of the core between the convolutions of the grooves being relatively thin, the entire outer surface of the core and filling material is heated to substantially the same degree by the heating wire and as a result, infra-red rays are projected from the entire outer surface of the heating element in a substantially uniform manner, when the degree of heating to which the element is subjected, heats its outer surface to a dull red heat.

As indicated in Fig. 3 the heating elements 20 are mounted in a plane substantially parallel with the open end of the reflector 11 and thus each of the elements 20 is effective in directing rays outwardly from substantially half of its surface, while the rays projected from the other half of its surface are directed outwardly by the reflector 11 and in this manner substantially all of the radiating effect of the heating elements is utilized. As indicated in Fig. 3, the arms 13 and 14 are secured at their inner ends in any convenient manner, for example by screws, to a plug of refractory insulating material 26 contained in the reflector 11 and secured to the insulating support 10 by threaded conducting rods 27 and 28, which extend entirely through the support 10 and connect with the two terminals 12ª and 12ᵇ respectively of the connecting plug 12. At its inner end the rod 27 is electrically connected with the arm 13 and the inner end of the rod 28 is electrically connected with the arm 14, so that the arms 13 and 14 become parts of the supply circuit for supplying current to the heating elements 20. The insulation of the arm 14 from the ring 17 as well as the electrical connection between the rod 23 and the ring 22 and the arm 14 is indicated in Fig. 3, which results in the rings 17 and 22 forming the electrical supply terminals for the several heating elements 20. From this and the slotted construction of the rings above described, it will appear that the insertion of any one of the heating elements 20 in the corresponding slots in the rings 17 and 22 and the clamping of the elements in place by the corresponding thumb nuts indicated, at the same time affords the heating element mechanical support and electrical connection with the circuit of the generator, and that the several heating elements are connected in parallel relation between the supply terminals of the circuit. Each one of the heating elements 20 therefore operates independently of the others to produce its intended heating and radiating effect, and when for any reason, for example for substitution or repair, it is necessary to remove one of the heating elements 20, it may readily be done by releasing its thumb nuts and removing the element from the slots in the supporting rings, leaving the generator operative as to the remaining heating elements so that if any delay is experienced in repairing or substituting the removed element, the generator as a whole is not put out of commission.

It will be noted that the arms 13 and 14 are provided adjacent their inner ends with U-shaped bends 13ª, 14ª respectively, and that they are bent inwardly at their outer ends; this construction affords a resilient support for the heating elements to protect them from jar and shock and the inturned outer ends of the arms tend to retain the heating element assembly in place against accidental dislodgment when it is desired to remove the assembled heating element as a whole from the generator.

While I have shown my invention in the particular embodiment above described, it will be understood that I do not limit myself to this exact construction as I may employ equivalents known to the art at the time of the filing of this application without departing from the scope of the appended claims.

What I claim is:

1. In an infra-red ray generator, the combination of a plurality of heating elements arranged substantially in the same plane normal to the axis of said generator, electrical connections at opposite ends of said elements, and electrical terminal bands of metal, each connected with one terminal of each of said elements, one of said bands comprising the mechanical support for said elements.

2. In an infra-red ray generator, the combination of a plurality of heating elements arranged substantially in the same plane normal to the axis of said generator, electrical connections at opposite ends of said elements, electrical terminal bands of metal, each connected with one terminal of each of said elements, and arms supporting said bands.

3. In an infra-red ray generator, the combination of a plurality of heating elements arranged substantially in the same plane normal to the axis of said generator, electrical connections at opposite ends of said elements, electrical terminal bands of metal, each connected with one terminal of each of said elements, and arms supporting said bands, one of said bands comprising the mechanical support for said elements.

4. In an infra-red ray generator, the combination of a plurality of heating elements arranged substantially in the same plane normal to the axis of said generator, electrical connections at opposite ends of said elements, electrical terminal bands of metal, each connected with one terminal of each of said elements, a reflector, and an insulating support for said reflector and said bands holding said elements substantially in the plane of the open end of said reflector.

5. In an infra-red ray generator, the combination of a plurality of heating elements arranged substantially in the same plane normal to the axis of said generator, electrical connections at opposite ends of said elements, electrical terminal bands of metal, each connected with one terminal of each of said elements, arms supporting said bands, a reflector, and an insulating support for said reflector and said arms holding said elements substantially in the plane of the open end of said reflector.

6. In an infra-red ray generator, the combination of a plurality of heating elements arranged substantially in the same plane normal to the axis of said generator, electrical connections at opposite ends of said elements, and electrical terminal bands of metal, each connected with one terminal of each of said elements, said electrical connections comprising screws and nuts readily separable from said bands as desired.

7. In an infra-red ray generator, the combination of two spaced and concentric mounting rings of metal, heating elements disposed between said rings and having their ends connected therewith, supporting arms connected with said rings, and an insulating support connected with said arms.

8. In an infra-red ray generator, the combination of two spaced and concentric mounting rings of metal, heating elements disposed between said rings and having their ends connected therewith, supporting arms connected with said rings, and in insulating support connected with said arms, the axis of said insulating support being substantially normal to the plane of said rings.

9. In an infra-red ray generator, the combination of two spaced and concentric mounting rings of metal, heating elements disposed between said rings and having their ends connected therewith, supporting arms connected with said rings, an insulating support connected with said arms, and a reflector mounted on said support with its open end substantially in the plane of said rings.

10. In an infra-red ray generator, the combination of two spaced and concentric mounting rings of metal, heating elements disposed between said rings and having their ends connected therewith, supporting arms connected with said rings, and an insulating support connected with said arms, said heating elements being cylindrical with their axes radially disposed between said rings.

11. In an infra-red ray generator, the combination of two spaced and concentric mounting rings of metal, heating elements disposed between said rings and having their ends connected therewith, supporting arms connected with said rings, an insulating support connected with said arms, said heating elements being cylindrical with their axes radially disposed between said rings, and a reflector mounted on said support with its open end substantially in the plane of said rings.

12. In an infra-red ray generator, the combination of two spaced and concentric mounting rings of metal, heating elements disposed between said rings and having their ends connected therewith, supporting arms connected with said rings, and an insulating support connected with said arms, the connections between said heating elements and said rings comprising screws and nuts readily separable to permit insertion and removal of said elements as desired.

13. In an infra-red ray generator, the combination of two spaced and concentric mounting rings of metal, heating elements disposed between said rings and having their ends connected therewith, supporting arms connected with said rings, and an insulating support connected with said arms, the connections between said heating elements and said rings comprising screws and nuts readily separable to permit insertion and removal of said elements as desired, said rings having open ended slots for receiving said screws to facilitate the insertion and removal of said elements.

14. In an infra-red ray generator, the combination of two spaced and concentric mounting rings of metal, heating elements disposed between said rings and having their ends connected therewith, supporting arms connected with said rings, and an insulating support connected with said arms, said rings being insulated from each other and comprising the electrical connections for supplying current to said heating elements.

15. In an infra-red ray generator, the combination of two spaced and concentric mounting rings of metal, heating elements disposed between said rings and having their ends connected therewith, supporting arms connected with said rings, and an insulating support with said rings, and an arms, said rings being connected with said arms, said rings being insulated from each other and comprising the electrical connections for supplying current to said heating elements, and each of said arms being electrically connected with one of said rings and insulated from the other of said rings.

16. In an infra-red ray generator, the combination of two spaced and concentric mounting rings of metal, heating elements disposed between said rings and having their ends connected therewith, supporting arms connected with said rings, an insulating support connected with said arms, said rings being insulated from each other and comprising the electrical connections for supplying current to said heating elements, both of said arms being mechanically connected with the outer one of said rings, one of said arms being electrically connected with and the other of said arms being insulated from said outer ring, and an electrical connection between said insulated arm and the inner one of said rings.

17. In an infra-red ray generator, the combination of two spaced and concentric mounting rings of metal, heating elements disposed between said rings and having their ends connected therewith, supporting arms connected with said rings, and an insulating support connected with said arms, said heating elements each comprising a cylindrical core of refractory insulating material having a helical groove in its outer surface, a helically wound resistance wire wound in said groove, said grooves being substantially deeper than the outside diameter of said helically wound wire, and a filling of refractory insulating material in said groove outside of said wire retarding free heat radiation from said wire.

18. In an infra-red ray generator, the combination of two spaced and concentric mounting rings of metal, heating elements disposed between said rings and having their ends connected therewith, supporting arms connected with said rings, and an insulating support connected with said arms, said heating elements each comprising a cylindrical core of refractory insulating material having a helical groove in its outer surface, a helically wound resistance wire wound in said groove, said groove being deeper than the outside diameter of said helically wound wire by an amount substantially equal to the separation of adjacent convolutions of said groove, and refractory insulating material filling said groove outside of said wire.

19. In an infra-red ray generator, the combination of two spaced and concentric mounting rings of metal, heating elements disposed between said rings and having their ends connected therewith, supporting arms connected with said rings, and an insulating support connected with said arms, said arms having bends in them affording a resilient support for said rings.

20. In an infra-red ray generator, the combination of two spaced and concentric mounting rings of metal, heating elements disposed between said rings and having their ends connected therewith, supporting arms connected with said rings, an insulating support connected with said arms, a screw and nut connection between one of said arms and the outer one of said rings insuring electrical connection between said arm and said ring, and a threaded rod electrically connected with the other of said arms and extending to and making electrical connection with the inner one of said rings, said threaded rod being mechanically connected with but insulated from the outer one of said rings.

21. In an infra-red ray generator, the combination of two spaced and concentric mounting rings of metal, heating elements disposed between said rings and having their ends connected therewith, supporting arms connected with said rings, an insulating support connected with said arms, a screw and nut connection between one of said arms and the outer one of said rings insuring electrical connection between said arm and said ring, and a threaded rod electrically connected with the other of said arms and extending to and making electrical connection with the inner one of said rings, said threaded rod being mechanically connected with but insulated from the outer one of said rings, each of said heating elements comprising a core of insulating material and a resistance wire having its ends connected respectively with said rings.

22. In an infra-red ray generator, the combination of two spaced and concentric mounting rings of metal, heating elements disposed between said rings and having their ends connected therewith, supporting arms connected with said rings, an insulating support connected with said arms, said insulating support being elongated to form a handle for said generator, a two part electrical plug on the end of said support remote from said arms, and rods extending through said support electrically connecting said arms respectively with the parts of said plug.

23. A heating element for an infra-red ray generator comprising a core of refractory insulating material having a groove in its outer surface, a resistance wire in said groove, and refractory insulating material filling said groove outside of said wire, said filling material having a depth distributing the heating effect of said wire through the outer portion of said core and through said filling material to heat them substantially uniformly to a dull red heat.

24. A heating element for an infra-red ray generator comprising a core of refractory insulating material having a groove in its outer surface, a resistance wire in said groove, and refractory insulating material filling said groove outside of said wire, said filling material having a depth distributing the heating effect of said wire through the outer portion of said core and through said filling material to heat them substantially uniformly to a dull red heat, said groove being helical and extending from end to end of said core, and said wire being in helically wound condition before being wound in said groove.

25. A heating element for an infra-red ray generator comprising a core of refractory insulating material having a groove in its outer surface, a resistance wire in said groove, and refractory insulating material filling said groove outside of said wire, said filling material having a depth distributing the heating effect of said wire through the outer portion of said core and through said filling material to heat them substantially uniformly to a dull red heat, said groove being helical and extending from end to end of said core, and said wire being in helically wound condition before being wound in said groove, said groove being wider than the thickness of the portion of the core separating adjacent convolutions of said groove.

26. A heating element for an infra-red ray generator comprising a core of refractory insulating material having a groove in its outer surface, a resistance wire in said groove, refractory insulating material filling said groove outside of said wire, said filling material having a depth distributing the heating effect of said wire through the outer portion of said core and through said filling material to heat them substantially uniformly to a dull red heat, and screws projecting from the ends of said core for mounting purposes.

27. A heating element for an infra-red ray generator comprising a core of refractory insulating material having a groove in its outer surface, a resistance wire in said groove, refactory insulating material filling said groove outside of said wire, said filling material having a depth distributing the heating effect of said wire through the outer portion of said wire through the outer portion of said core and through said filling material to heat them substantially uniformly to a dull red heat, and screws projecting from the ends of said core for mounting purposes, said screws being insulated from each other and connected with the ends of said wire.

28. A heating element for an infra-red ray generator comprising a core of refractory insulating material having a groove in its outer surface, a resistance wire in said groove, refractory insulating material filling said groove outside of said wire, said filling material having a depth distributing the heating effect of said wire through the outer portion of said core and through said filling material to heat them substantially uniformly to a dull red heat, said groove being helical and extending from end to end of said core, and said wire being in helically wound condition before being wound in said groove, and screws projecting from the ends of said core for mounting purposes.

29. A heating element for an infra-red ray generator comprising a core of refractory insulating material having a groove in its outer surface, a resistance wire in said groove, refractory insulating material filling said groove outside of said wire, said filling material having a depth distributing the heating effect of said wire through the outer portion of said core and through said filling material to heat them substantially uniformly to a dull red heat, said groove being helical and extending from end to end of said core, and said wire being in helically wound condition before being wound in said groove, and screws projecting from the ends of said core for mounting purposes, said screws being insulated from each other and connected with the ends of said wire.

In witness whereof, I hereunto subscribe my name this 23rd day of December, A. D. 1926.

HECTOR P. MacLAGAN.